(12) United States Patent
Kitamura

(10) Patent No.: US 6,883,094 B2
(45) Date of Patent: Apr. 19, 2005

(54) COMMUNICATION DEVICE FOR MONITORING DATALINK LAYER INFORMATION AND OUTPUTTING DATA BASED ON COMMUNICATION REQUEST INFORMATION TYPE

(75) Inventor: Takuya Kitamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 611 days.

(21) Appl. No.: 10/083,758

(22) Filed: Feb. 26, 2002

(65) Prior Publication Data
US 2003/0065799 A1 Apr. 3, 2003

(30) Foreign Application Priority Data
Sep. 28, 2001 (JP) ...................... 2001-302469

(51) Int. Cl.$^7$ .................. G06F 13/14; G06F 13/38
(52) U.S. Cl. .............. 713/150; 713/155; 713/168; 709/224; 709/250; 370/351; 710/36; 710/38
(58) Field of Search ................ 713/150, 151, 713/155, 168, 169; 709/224, 250; 370/351; 710/36, 38

(56) References Cited

U.S. PATENT DOCUMENTS 5,862,335 A * 1/1999 Welch et al. ............ 709/224
6,282,563 B1 * 8/2001 Yamamoto et al. ......... 709/202
6,570,867 B1 * 5/2003 Robinson et al. ........... 370/351
6,829,232 B1 * 12/2004 Takeda et al. ............. 370/352

FOREIGN PATENT DOCUMENTS

| JP | 52-055412 | 5/1977 | |
| JP | 52-125210 | 10/1977 | |
| JP | 59-050690 | 3/1984 | |
| JP | 403196739 A | * 8/1991 | ............ 370/349 |
| JP | 07-336379 | 12/1995 | |

* cited by examiner

Primary Examiner—Rehana Perveen
(74) Attorney, Agent, or Firm—Katten Muchin Zavis Rosenman

(57) ABSTRACT

In a communication device for providing a communication between a user terminal and a network service provider apparatus, datalink layer information included in data transmitted from a source user terminal is read, a communication function of an existing protocol of outputting data group to a network service provider apparatus when the datalink layer information includes communication request information to the network service provider apparatus is maintained, and the data are outputted directly to a destination user terminal when the datalink layer information includes shortcut communication request information to the destination user terminal.

11 Claims, 13 Drawing Sheets

| PORT | MAC ADDRESS | PPPoE SESSION ID | IP ADDRESS | GROUP ID | CARRIER NETWORK CONNECTION AVAILABILITY | TTL |
|---|---|---|---|---|---|---|
| P1 | 00:00:0E:11:22:xx | 0x0001 | 112.116.5.xxx | 0xFD376458 | 0x0001 | 0x0020 |
| P2 | 00:00:0E:22:33:xx | 0x0003 | 168.34.22.xxx | 0xFD376458 | 0x0001 | 0x003E |

TBL

COMMUNICATION DEVICE FOR MONITORING DATALINK LAYER INFORMATION AND OUTPUTTING DATA BASED ON COMMUNICATION REQUEST INFORMATION TYPE

BACKGROUND OF THE INVENTION

1. Field of the Invention

The present invention relates to a communication device, and in particular to a communication device for performing communications between a user terminal and a network service provider apparatus.

An Internet/intranet access system charged on an as-used basis realized by a dial-up utilizing an ISDN or a telephone line has been rapidly shifting towards a system charged on a fixed-price basis similar to a system utilizing a leased line yet being inexpensive due to the advent of new high-speed transmission technologies such as an ADSL (Asymmetric Digital Subscriber Line)/FTTH (Fiber To The Home) or the competition heat-up among carriers.

A service for a general home firstly requires easy network connections, so that an Ethernet is preferable as an interface provided for users. On the other hand, an ISP (Internet Service Provider) providing an Internet connection service requires that the user management is performed by the same mechanism as a conventional dial-up system such as point-to-point protocol (PPP).

In order to satisfy these two requirements, has been devised a PPPoE (PPP over Ethernet) encapsulating the PPP on the Ethernet, which is prescribed by the document RFC2516 of the IETF (Internet Engineering Task Force). The service utilizing this technology is receiving attention in countries of the world.

2. Description of the Related Art

An access line applying thereto the ADSL or the FTTH has a mechanism that a user side device cannot access the devices other than the carrier devices. However, in the future, developments are expected of an Ethernet access network carrying the Ethernet directly on an optical fiber to perform switching on a utility pole and the like.

Such an Ethernet access network has an arrangement shown in FIG. 1 which will be specifically described later. Namely, user terminals 11 and 12 are connected to an edge device 18 which is an ISP terminal respectively through ONU's 13 and 14 as well as a communication device 15. The user terminals 11 and 12 access the Internet INET through the edge device 18.

In consideration of security, this network uses a technology such as a VLAN (Virtual LAN) defined by the IEEE802.1Q to prevent the user terminals 11 and 12 from accessing devices other than the edge device 18.

Namely, while the Ethernet inherently enables a direct communication with e.g. a personal computer of a next door, it is possible that a malicious third party if any would steal a glance at a frame or access the network using another person's ID.

Since it is difficult to take defensive measures thereof especially for a beginner or the like who does not have knowledges concerning security, the mechanism is provided such that communications are made through the edge device 18 providing security measures.

With the above-mentioned mechanism using the above noted PPPoE, in order that the user terminal 11 communicates with the user terminal 12, a frame 23 once flows to the edge device 18 through the ONU 13 and the communication device 15, and then returns therefrom for the communication. Moreover, when the user terminals 11 and 12 have respectively subscribed to different ISP's, the communication is made through the Internet.

This is not only a waste of the bandwidth, but also results in such a problem that the load of the edge device 18 is increased. In the future, the ratio of the communication between the devices at a physically short distance from each other is expected to increase due to widespread of online games, the advent of applications stuck on community, and network support of various apparatuses.

However, in the extension of the current system, if the available bandwidth per user terminal is increased by 10 times, a simple calculation shows that an edge device with a processing performance of 10 times the current state multiplied by a number of users will be required.

Therefore, if the system utilizing the Ethernet is simply constructed, the above-mentioned problem of security arises, so that a mechanism is required to enable a shortcut communication (communication not through the edge device 18) maintaining the current security level.

Namely, in order to perform the shortcut communication not through the edge device 18 without constructing a system between the user terminals, the communication device 15 mutually connecting the user terminals 11 and 12 is required to transmit a frame received from the user terminals 11 and 12 directly to the destination user terminal without transmitting it to the edge device 18.

SUMMARY OF THE INVENTION

It is accordingly an object of the present invention to provide a communication device, for performing communications between a user terminal and a network service provider apparatus, which enables a speedup of the communication by a shortcut communication between user terminals.

In order to achieve the above-mentioned object, a communication device according to the present invention comprises: a connection processor for communication between a user terminal and a network service provider apparatus; an information monitor for reading datalink layer information included in data transmitted from a source user terminal and for monitoring whether or not communication request information to the network service provider apparatus or shortcut communication request information with a destination user terminal is included in the datalink layer information; and a controller for outputting the data to the network service provider apparatus when the datalink layer information includes the communication request information, and for outputting the data to the destination user terminal when the datalink layer information includes the shortcut communication request information.

Namely, in the present invention, datalink layer information included in data transmitted from a source user terminal is read. When the datalink layer information includes communication request information to the network service provider apparatus, a communication function based on an existing protocol of outputting data group to a network service provider apparatus is maintained. When the datalink layer information includes shortcut communication request information with a destination user terminal, the data may be outputted directly to the destination user terminal.

Therefore, it becomes unnecessary to constrain the network service provider apparatus longer than necessary even when the data amount outputted from the source user terminal to the destination user terminal becomes enormous, thereby enabling a speedup of the communication. (claim 1)

Also, the shortcut communication request information may be encapsulated in the datalink layer information. (claim 2)

Also, the shortcut communication request information may be encapsulated in an Ethernet protocol within the datalink layer information.

Therefore, when the datalink layer information of the Ethernet is read, the shortcut communication request information is read regardless of whether or not protocol information such as PPPoE or the like included in the datalink layer information is read, so that maintenance of the connection state by the protocol information such as the PPPoE or the like becomes unnecessary. As a result, an overhead of the connection state can be eliminated, so that bandwidth usage efficiency can be increased. (claim 3)

Also, the communication request information may comprise a PPPoE protocol, and the shortcut communication request information may be encapsulated in the PPPoE protocol within the datalink layer information.

Therefore, the shortcut communication between the user terminals is enabled by effectively utilizing e.g. the protocol such as the PPPoE which is utilized between the existing user terminals and the network service provider terminal. (claim 4)

Also, the datalink layer information may include authentication information, and the controller may determine whether or not a shortcut communication between the source user terminal and the destination user terminal is allowed based on the authentication information to make the connection processor output the data to the destination user terminal when the shortcut communication is allowed.

Therefore, a confirmation with the counterpart is required instead of unconditionally transmitting the data to the destination terminal upon the shortcut communication, thereby enabling protection against an unauthorized access. (claim 5)

Also, authentication information may be described in a format based on a RADIUS format, and the controller may output the authentication information to a RADIUS server to determine whether or not the shortcut communication is allowed by referring to a verification result in the RADIUS server.

Therefore, a highly reliable authentication is performed by a RADIUS format upon the shortcut communication, thereby enabling protection against an unauthorized access in the shortcut communication. (claim 6)

Also, the controller may be provided with a memory for holding address information of the source user terminal and the destination user terminal associated with a communication port, and may make the connection processor output the data through the communication port associated with the address information included in the shortcut communication request information when the data include the shortcut communication request information.

Therefore, the shortcut communication can be performed by only referring to the address information included in the direct communication request information. (claim 7)

Also, the connection processor may suspend the communication with the network service provider apparatus when suspension request information of a connection with the network service provider apparatus is included in the communication request information of a reading result by the information monitor. (claim 8)

Also, the controller may control an output destination of the data by rewriting an MAC address included in the datalink layer information. (claim 9)

Also, the controller may determine whether or not a shortcut communication between the source user terminal and the destination user terminal is allowed by verifying the authentication information included in the datalink layer information from the source user terminal against the authentication information from the destination user terminal. (claim 10)

Also, the connection processor may restart the communication with the network service provider apparatus when restart request information of the connection with the network service provider apparatus is included in the communication request information of a reading result by the information monitor. (claim 11)

BRIEF DESCRIPTION OF THE DRAWINGS

Throughout the figures, like reference numerals indicate like or corresponding components.

DESCRIPTION OF THE EMBODIMENTS

Figure 1:
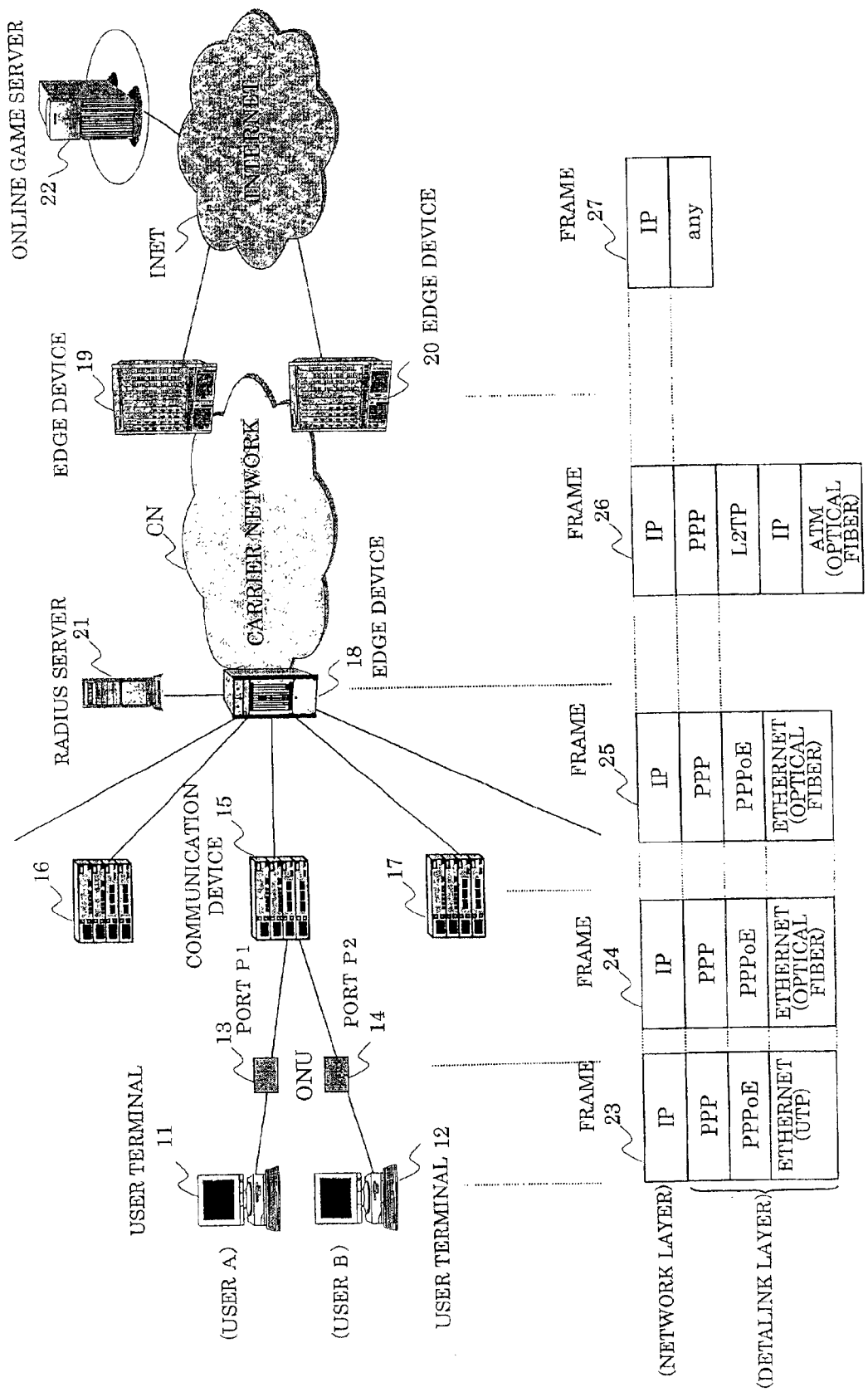
FIG. 1 is a schematic diagram showing an arrangement of a network to which an embodiment of a communication device according to the present invention is applied.

FIG. 1 shows an arrangement of a network to which the present invention is applied. As above mentioned, the network is composed of the user terminals 11 and 12, the optical network units (ONU) 13 and 14, the communication devices 15–17, the edge devices 18–20, the RADIUS server 21, and the online game server 22.

The user terminals 11 and 12 are respectively connected to the ONU's 13 and 14 with the Ethernet, and are commonly connected to the communication device 15 of the present invention through the ONU's 13 and 14. The ONU's 13 and 14 are installed in subscriber homes of the optical fiber to connect user terminals such as personal computers (PC) to the optical fiber.

It is to be noted that the communication devices 16 and 17 are also shown on the network, and a plurality of user terminals (not shown) are similarly connected thereto respectively.

The communication device 15 is connected to the edge device 18 composing a provider terminal. The user terminals 11 and 12 are connected to the edge device 18 through the communication device 15, thereby enabling an access to the Internet.

The RADIUS server 21 for authentication is connected to the edge device 18, which is connected to the edge devices 19 and 20 through a carrier network CN. The edge devices 19 and 20 compose service providers (ISP's) of the Internet INET, and the online game server 22 is connected thereto through the Internet INET.

In such an arrangement, when at the user terminals 11 and 12, users enjoy playing a game on the network, they access the online game server 22 through the network routes as described above.

Frames 23–27 shown in the lower part of FIG. 1 schematically show protocols of data transmitted from the user terminals 11 and 12 to the online game server 22, and show only the datalink layer and the network layer related to the present invention.

Firstly, the frame 23 will be described as follows: The user terminals 11 and 12 are connected to the ONU's 13 and 14 respectively with a LAN cable such as a UTP (Unshielded Twisted Pair) or a optical fiber of 10BASE-T or the like to communicate by the Ethernet protocol.

Therefore, the user terminals 11 and 12 transmit the frame 23 with an arrangement including an IP address in the network layer, and a PPP, a PPPoE, and an Ethernet protocol in the datalink layer to the ONU's 13 and 14 respectively.

It is to be noted that "Ethernet (UTP)" shown in e.g. the frame 23 indicates that the physical layer is a UTP or an optical fiber. Hereinafter, the parenthesized lowest layer indicates the contents of the physical layer.

Since the ONU's 13 and 14 communicate with the communication device 15 by the Ethernet protocol in the same way as with the case of the frame 23, the frame 24 has the same format with that of the frame 23. Accordingly, the ONU's 13 and 14 transmit the frame 24 with the same format as that of the frame 23 to the communication device 15. Thus, although the physical layer of the frame 24 is changed from the UTP to the optical fiber, the datalink layer is not influenced.

Since the communication device 15 communicates with the edge device 18 by the Ethernet protocol of the optical fiber in the same way as the frame 24, the physical layer of the frame 25 does not change. Thus, the communication device 15 transmits the frame to the edge device 18 without rewriting as shown in the frame 25.

Since the edge device 18 is connected to the edge devices 19 and 20 through an ATM (Asynchronous Transfer Mode), the frame 26 has a format for communicating not by the PPPoE but by an L2TP (Layer 2 Tunneling Protocol).

Therefore, the edge device 18 rewrites the PPPoE into the L2TP in the datalink layer and the Ethernet protocol into the IP address and the format of the ATM, respectively as shown by the frame 26, to be transmitted to the edge device 19 or 20.

Since the edge devices 19 and 20 are connected to the online server 22 through the Internet INET, the connection of the frame 27 on the Internet INET is not restricted to the Ethernet, and means of connection are not specified.

However, the transmission route is determined based on the IP address of the destination, so that the edge devices 19 and 20 use the IP address of the frame 26 unchanged and rewrites the rest depending on the route where the frame 27 passes as shown by the frame 27 to be transmitted to the online game server 22.

The frame from the online game server 22 to the user terminals 11 and 12 is rewritten by following the above-mentioned flow in the opposite direction.

Figure 2:
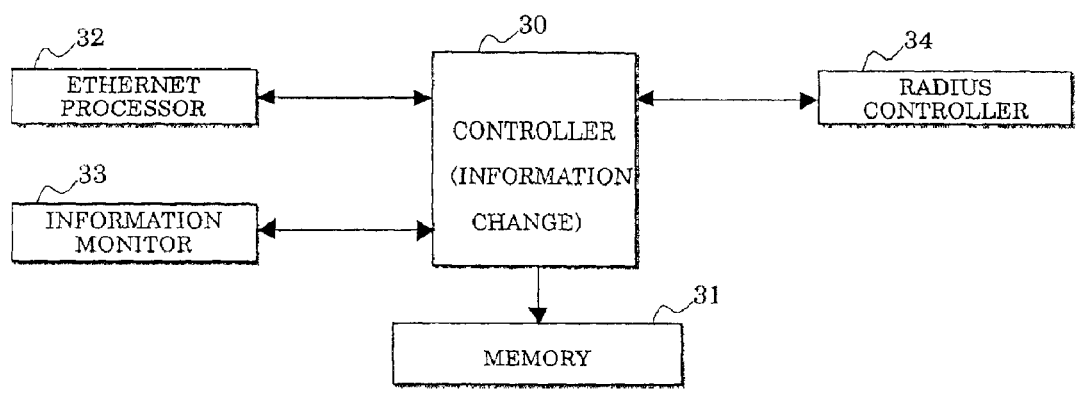
FIG. 2 is a block diagram showing an embodiment of an arrangement of a communication device according to the present invention.

FIG. 2 shows an arrangement of a communication device according to the present invention. The communication device is composed of a controller 30, a memory 31, an Ethernet processor 32, an information monitor 33, and a RADIUS controller 34, each of which may utilize a CPU, a ROM, a RAM and the like.

Among these, the controller 30 performs an overall control related to the present invention including the change of the frame information and the management of tables. The memory 31 holds data and the like required for processing the controller 30. The Ethernet processor 32 performs the communication processing such as the PPPoE.

The information monitor 33 identifies the contents of the received frame, and the RADIUS controller 34 performs a transmission/reception process of the frame to/from the RADIUS server 21.

Embodiment (1): FIGS. 3–13

Figure 3:
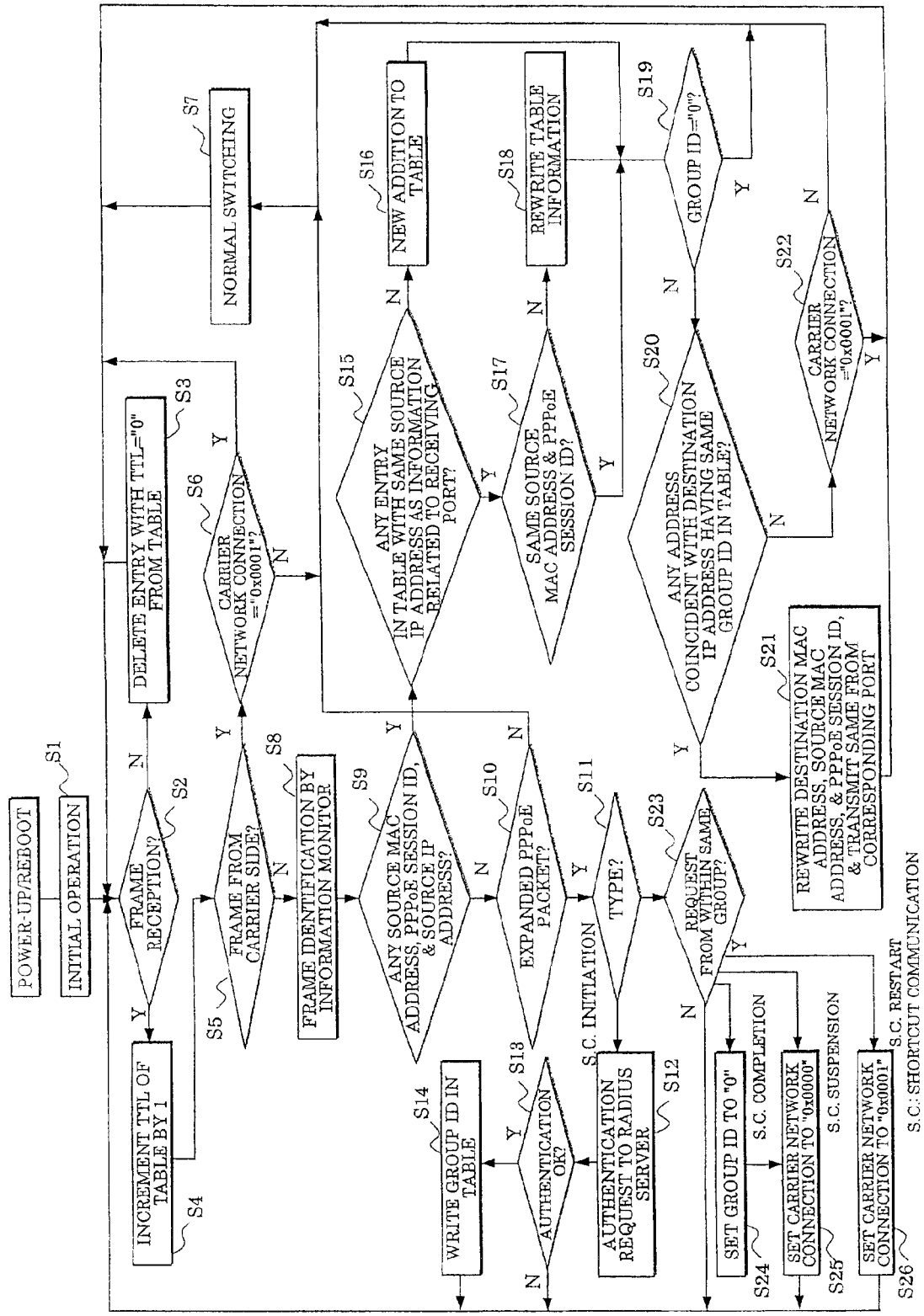
FIG. 3 is a flow chart showing a control program of an operation embodiment (1) executed by a communication device according to the present invention.
Figures 4, 5:
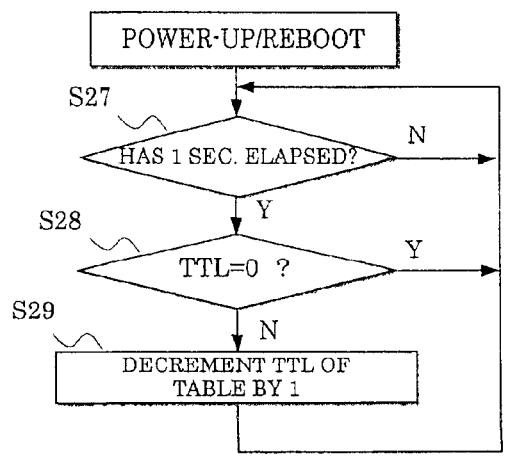
FIG. 4 is a flow chart showing a control program for TTL count used in operation embodiments executed by a communication device according to the present invention.
FIG. 5 is a diagram showing a table for holding information corresponding to ports in operation embodiments of a communication device according to the present invention.

FIGS. 3 and 4 show flow charts of an operation embodiment (1) of the communication device shown in FIG. 2. FIG. 5 shows a table associated with the connected terminals held by the communication device 15. FIGS. 6–11 show formats of the frames exchanged between the user terminal 11 and the communication device 15. Hereinafter, the operation embodiment (1) of the communication device 15 shown in FIGS. 1 and 2 will be described referring to FIGS. 3–11.

Firstly, the user terminals 11 and 12 of FIG. 1 have IP addresses allocated for respective connections to the edge devices 19 and 20, are individually connected to the Internet INET, and are in a state where communications can be performed only through the Internet INET.

Now, users A and B respectively using the user terminals 11 and 12 find that they are using the same access service within the same message area (MA) by a certain Web bulletin board, and both have decided to play against each other with the online game using a shortcut service.

For the sake of simplifying the description, it is supposed that the frame 23 (24) during a shortcut communication flows only from the user terminal 11 to the user terminal 12, and the frame 23 (24) for an initiation, a suspension, a restart, or a completion of the shortcut communication is received from both of the user terminals 11 and 12. The same applies to the case where the user terminal 12 transmits a frame to the user terminal 11. It is to be noted that the frames 23 and 24 have the same contents.

Firstly, the controller 30 executes an initial operation for initiating a communication (at step S1). Then, the Ethernet processor 32 enters into a frame wait state, and the controller 30 determines whether or not the Ethernet processor 32 has received the frame 24 (at step S2).

If the Ethernet processor 32 has not received the frame 24, the controller 30 deletes an entry of a port whose TTL (Time To Live) value counted as shown in FIG. 4 assumes "0" from the table TBL shown in FIG. 5 (at step S3).

The TTL value is decremented by "1" every second. As for the information with the TTL value of "0", the entry thereof is deleted from the table TBL. The TTL value is reset to the initial value every time some frame is transmitted from the user terminals 11 and 12.

Specifically, as shown in FIG. 4, the controller 30 waits for one second lapse of the timer (at step S27). In one second, the controller 30 determines whether or not the TTL value of each port is "0" (at step S28). In case of "0", the change of the TTL value is unnecessary, so that the routine returns to step S27. It is to be noted that the data corresponding to the ports P1 and P2 whose TTL value assumes "0" will be deleted from the table TBL as mentioned above.

If the TTL value is not "0", the controller 30 decrements the TTL value of each port by "1" (at step S29), and the routine returns to step S27. It is to be noted that the processing of the TTL value is executed by the controller 30 independently of the flow chart shown in FIG. 3.

Hereinafter, the contents of the table TBL shown in FIG. 5 will be described. The communication device 15 has the ports P1 and P2 (see FIG. 1), and communicates with the user terminals 11 and 12 through the ports P1 and P2. The memory 31 holds a MAC address, a PPPoE session ID, an IP address, a group ID, a carrier network connection availability, and a TTL value (hexadecimal number) respectively associated with the ports P1 and P2.

Among these, the MAC address, the PPPoE session ID, and the IP address are used for specifying the destination user terminal. The group ID is used for the authentication with the destination user terminal. The carrier connection availability is used for determining whether or not a shortcut communication is performed. The TTL value has been described above.

Returning to the flow chart of FIG. 3, when the Ethernet processor 32 receives the frame 24, the controller 30 increments the TTL value by "1" (at step S4).

The controller 30 determines whether or not the received frame is the frame 25 transmitted from the carrier network CN, i.e. from the edge device 18 (at step S5).

When the received frame is determined to be the frame 25 transmitted from the edge device 18, the Ethernet processor 32 checks the connection states with the edge devices 19 and 20 (at step S6). As a result, if the connection with the edge devices 19 and 20 is interrupted, the frame 25 need not be processed, so that the routine returns to step S2 again, and the Ethernet processor 32 enters into the frame reception wait state.

If the connection with the carrier network CN is not interrupted, and in the state where the frames are received, the Ethernet processor 32 processes the frame by a normal switching (at step S7), and the routine returns to step S2.

The information monitor 33 identifies the contents of the received frame 24 (at step S8). As a result of the identification by the information monitor 33, the controller 30 determines whether or not the source MAC address, the PPPoE session ID, and the IP address are included in the received frame 24 (at step S9). The routine proceeds to step S10 if they are not included, and to step S15 otherwise.

The information monitor 33 determines whether or not the data of the expanded PPPoE, which will be later described, is included in the frame 24 (at step S10). If the data are not included, the routine proceeds to step S7 and a normal switching is performed.

If the data of an expanded PPPoE are included in the frame 24, the information monitor 33 determines the type of the frame (at step S11). In case a frame indicates a shortcut communication initiation, the routine proceeds to the authentication process of step S12 and thereafter, while proceeding to step S23 if it is not the case.

Figure 6:
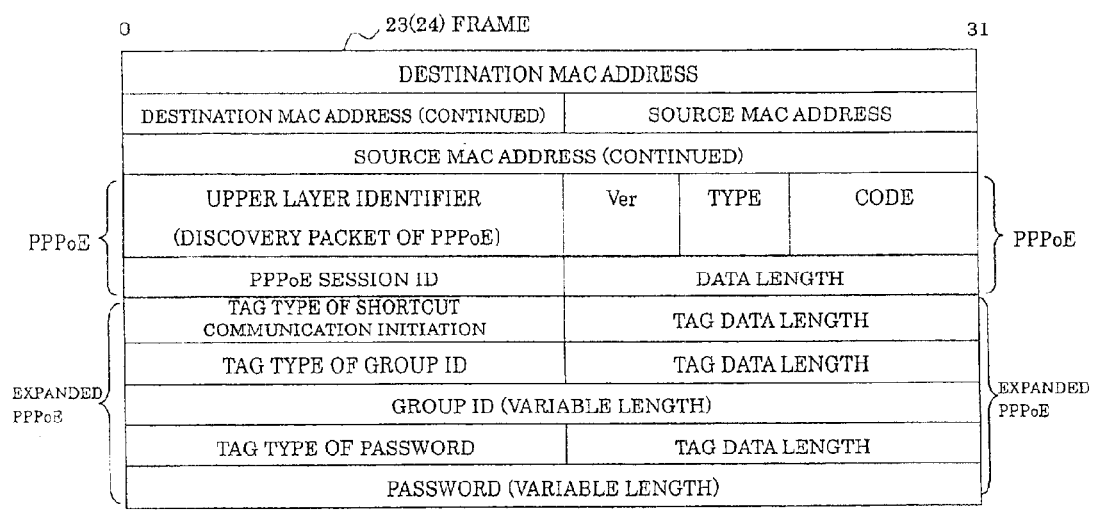
FIG. 6 is a diagram showing a format of a frame received when a shortcut communication is initiated in operation embodiments of a communication device according to the present invention.

FIG. 6 shows a format of the frame 24 at the time of shortcut communication initiation.

The frame 24 at the shortcut communication initiation is composed, as usual, of seven layers of a physical layer, a datalink layer, a network layer, a transport layer, a session layer, a presentation layer, and an application layer.

It is to be noted that the network layer and the upper layers thereof are not changed, and are common in the regions on the network. The physical layer is related only to the cables, connectors, and the like. Therefore, in the description of the frame hereinafter, only the datalink layer involving changes of the contents by the present invention will be described as described in FIG. 1.

The MAC address forming the datalink layer is an address uniquely assigned to each terminal on the network. The destination MAC address and the source MAC address are written in the frame. For example, when a frame is transmitted from the ONU 13 to the communication device 15, the MAC address of the communication device 15 is written in the destination MAC address and the MAC address of the ONU 13 is written in the source MAC address.

When transferring the frames to the other terminals, the communication device 15 rewrites the destination MAC address depending on the destination terminal and rewrites the source MAC address into the MAC address of communication device 15.

The PPPoE protocol written next is composed of an upper layer identifier, a version, a type, a code, a PPPoE session ID, and a data length. The arrangement thereof is the same as the frame arrangement in the normal communication.

Following the PPPoE protocol, a TAG type of the shortcut communication initiation, a TAG data length, a TAG type of a group ID, a TAG data length, a group ID, a TAG type of a password, a TAG data length, and a password are written as being encapsulated in the PPPoE protocol for the above-mentioned expanded portion of the PPPoE.

For the determination method of the group ID, the group ID may be preliminarily determined by the users performing the shortcut communication using communication means such as a mail, a chat, or a telephone. Also, it is possible for e.g. the provider of the online game to automatically allocate the group ID by obtaining the information indicating whether or not the users are able to perform a shortcut communication on a real time basis.

The arrangement included in the expanded PPPoE is different from the conventional PPPoE, and the presence/absence of the TAG type of the shortcut communication is used for determining whether or not the shortcut communication has been initiated (at step S11).

When it is found that the frame 24 from the user terminals 11 and 12 is requesting the initiation of the shortcut communication at step S11, if it is assumed that the shortcut communication between the user terminals 11 and 12 is permitted by the group ID's of both parties being mutually matched, there is a possibility that a malicious third party somehow obtains the group ID and intrudes into the shortcut inter-group communication.

For the means of protection against the malicious intrusion, an user authentication cooperative with the RADIUS server 21 (see FIG. 1) utilizing a password is used here. Of course, the shortcut communication may be permitted only by the group ID, or the controller 30 may perform an user authentication without cooperating with the RADIUS server 21.

Figure 7:
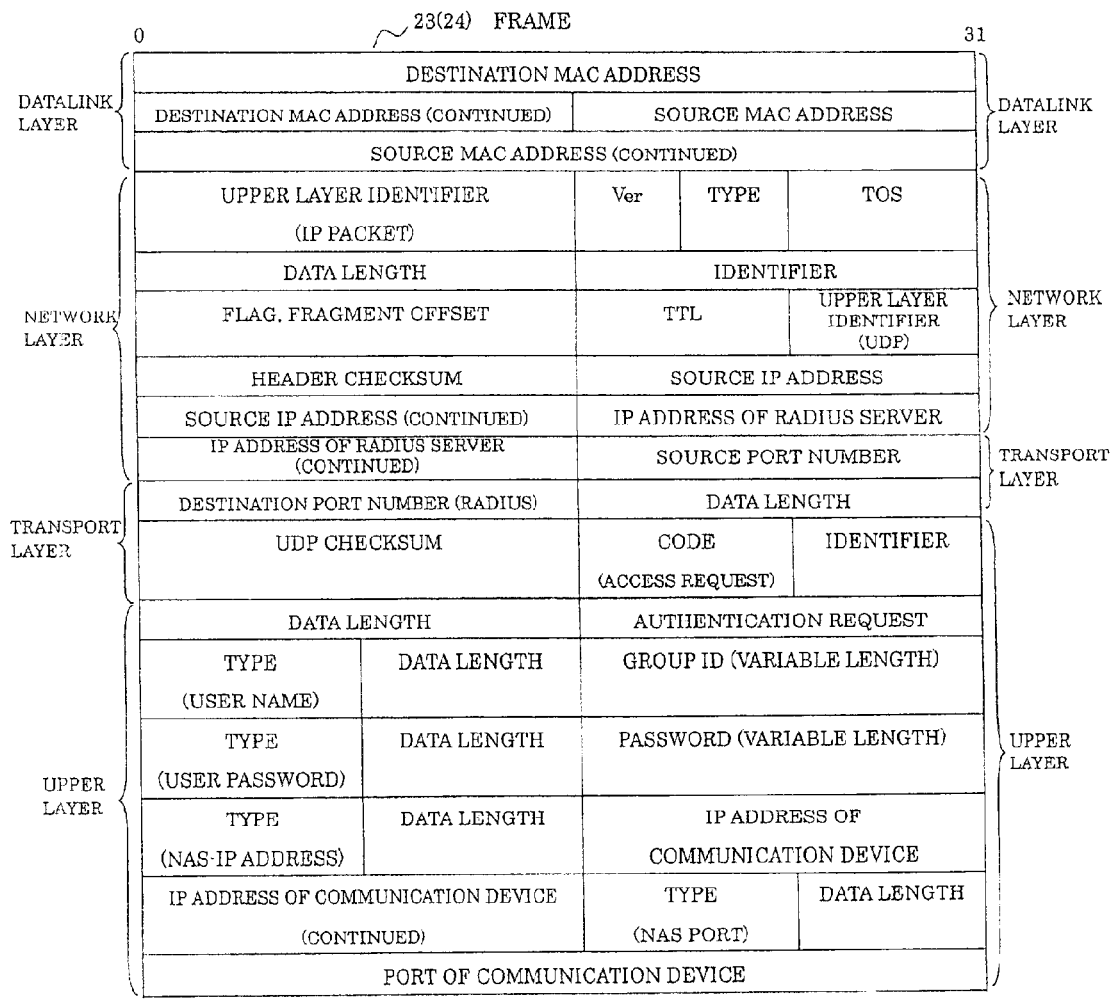
FIG. 7 is a diagram showing a format of a frame received when an authentication of a shortcut communication is requested in operation embodiments of a communication device according to the present invention.

The RADIUS controller 34 generates a frame shown in FIG. 7 to be transmitted to the RADIUS server 21 (at step S12). This frame is the RADIUS frame format itself that is currently defined by the RFC2865 and used.

The operation thereafter slightly depends on the authentication method. However, in the end a reply frame of the authentication OK or NG is returned from the RADIUS server to the communication device. Also for the sequence, what is prescribed in RFC2865 is used unchanged.

It is to be noted that in the arrangement of this case, a destination MAC address and a source MAC address are written in the datalink layer. An upper layer identifier, a version, a type, a service type (TOS), a data length, an identifier, a flag, a fragment offset, a TTL, an upper layer identifier (UDP), a header checksum, a source IP address, and an IP address of the RADIUS server are written in the network layer.

A source port number, a destination port number, a data length, and a UDP checksum are written in the transport layer, and a code (access request), an identifier, a data length, an authentication request, a group ID (including a type and a data length), a password (including a type and a data length), an IP address of the communication device (including a type and a data length), a type (NAS port), a data length, and a port of the communication device are written in the upper layer.

Then, the RADIUS controller 34 determines whether or not the authentication is successful (at step S13). If the authentication is unsuccessful, the shortcut communication cannot be performed, so that the routine returns to step S2 to wait for the frames.

If the authentication is successful, the controller 30 writes the received group ID in the table TBL shown in FIG. 5 mapped on the memory 31 (at step S14). By the exactly same process, the group ID is written after receiving the shortcut communication initiation request from the user terminal 12 and performing the authentication.

Returning to step S9, the case where the source MAC address, the PPPoE session ID, and the IP address are included in the received frame will be described.

When the source MAC address, the PPPoE session ID, and the IP address are included in the received frame 24, the information monitor 33 refers to the table TBL on the memory 31 to determine whether or not a port corresponding to the same IP address as the source IP address written in the frame 24 exists (at step S15).

The absence of the same IP address means that the information of the user terminal 11 does not exist on the table TBL, so that the controller 30 newly writes the information such as the MAC address, the PPPoE session ID, and the IP address corresponding to the user terminal 11 in the table TBL (at step S16).

In the presence of the same IP address at step S15, the controller 30 further compares the MAC address and the PPPoE session ID of the port of the IP address with those of the frame 24 to determine whether or not they are the same (at step S17).

If the information of the port and the information of the frame 24 do not coincide with each other, the controller 30 changes the contents of the table TBL according to the contents of the frame 24 (at step S18).

If the information of the port and the information of the frame 24 coincide with each other at step S17, the information monitor 33 confirms the group ID written in the frame 24 (at step S19). When the group ID is "0", the group ID is not set so that a shortcut communication cannot be performed. Thus, the routine returns to step S7, and the frame 24 is processed by the normal switching.

If the group ID is not "0", the controller 30 compares the information of the ports P1 and P2 stored in the table TBL, and determines whether or not a user terminal with the same IP address as the destination IP address exists (at step S20). It is to be noted that the group ID of the destination user terminal may be prepared in the table TBL shown in FIG. 5 beforehand, as well as may be received from the destination user terminal.

When it is determined that the group ID and the IP address respectively coincide with those of the destination user terminal, the controller 30 rewrites the information of the destination MAC address, the source MAC address, and the PPPoE session ID written in the datalink layer of the frame 24 into the information corresponding to the user terminal 12 in order to return the received frame 24 to the user terminal 12. The controller 30 then transmits the frame 24 shown in FIG. 6 to the user terminal 12 (at step S21).

Figure 8:
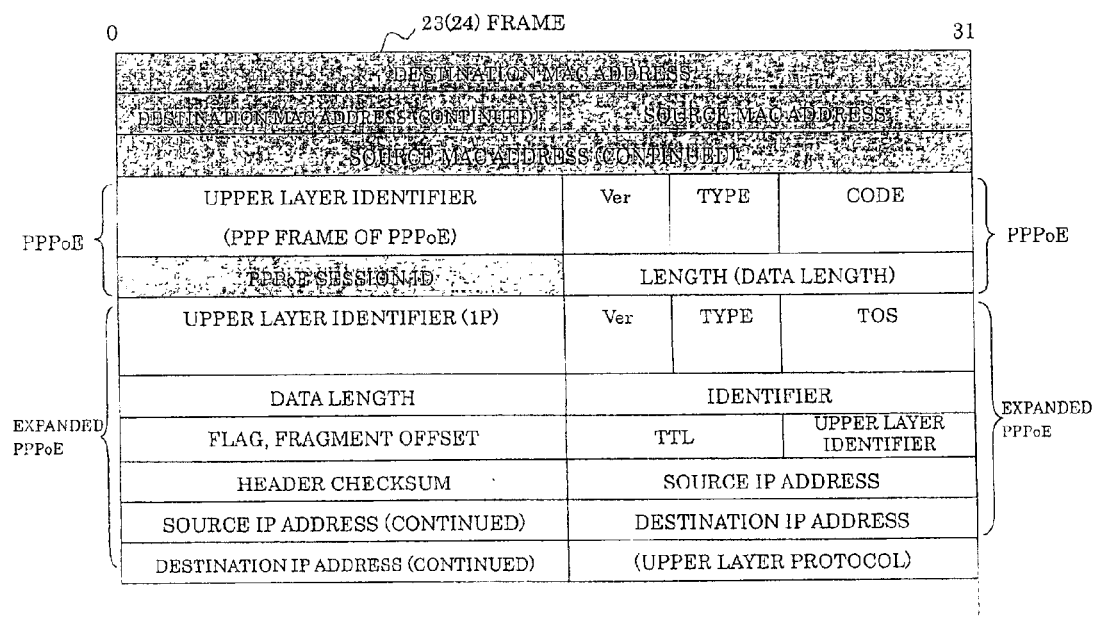
FIG. 8 is a diagram showing a format of a frame received during a shortcut communication in an operation embodiment (1) of a communication device according to the present invention.

FIG. 8 shows a frame format during the shortcut communication.

The description of the destination MAC address, the source MAC address, and the PPPoE protocol arrangement will be omitted since they are the same as those for the shortcut communication initiation in FIG. 6.

Also, the expanded portion of the PPPoE protocol follows in the same way. However, this arrangement is different from that of the shortcut communication initiation. Namely, in this expanded PPPoE portion, an upper layer identifier, a version, a type, a TOS, a data length, an identifier, a flag, a fragment offset, a TTL, an upper layer identifier, a header checksum, a source IP address, and a destination IP address are written. The arrangement thereof is the same as that written in the network layer of a frame in a normal communication. Namely, the same arrangement as that written in the network layer is written in the PPPoE expanded portion.

This is because since the IP address is necessary for determining whether or not to allow a shortcut communication using the table TBL shown in FIG. 5 although the communication device 15 can read only the information of the physical layer and the datalink layer, the communication device 15 should be made capable of reading the IP address as if reading the information of the datalink layer.

When the group ID and the IP address are determined not to respectively coincide with those of the destination user terminal at step S20, the controller 30 confirms the connection state with the carrier network CN (at step S22). If the connection with carrier network CN is interrupted, the frame need not be processed, so that the routine again returns to step S2, entering into the frame reception wait state.

If the connection with carrier network CN is not interrupted during the state of the frame reception, the routine returns to step S7 to process the frame 24 by the normal switching.

Returning to step S11, a case where the frame 24 does not include the data indicating the shortcut communication initiation will be described.

The information monitor 33 determines whether or not the frame 24 has been transmitted from the same group performing the shortcut communication (at step S23). If the frame is from outside of the same group, it is the frame from someone who is not a party to the shortcut communication, so that the routine returns to step S2 without processing, entering into the frame wait state.

Figure 9:
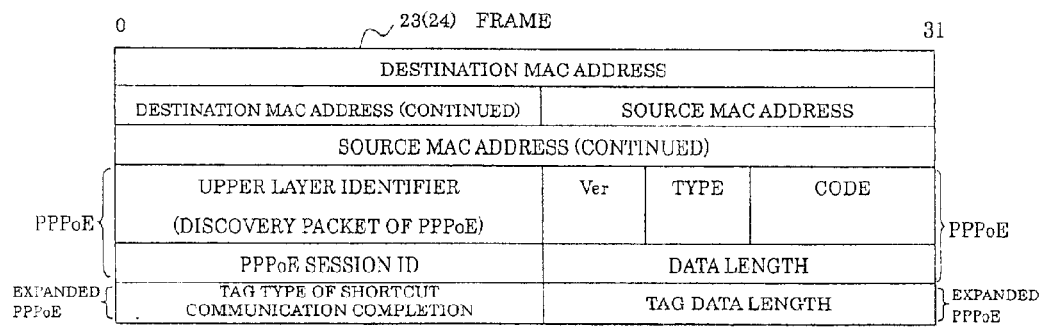
FIG. 9 is a diagram showing a format of a frame received when a shortcut communication is completed in operation embodiments of a communication device according to the present invention.

If the received frame 24 is one for the shortcut communication completion shown in FIG. 9, the controller 30 changes the group ID of the table TBL shown in FIG. 5 to "0" in order to complete the shortcut communication (at step S24). Then, the controller 30 sets the parameter of the carrier network connection availability to "0x0000" in order to restart the connection with the carrier network CN (at step S25) and returns to step S2 to wait for the frame.

FIG. 9 shows a frame format of the shortcut communication completion.

The description of the destination MAC address, the source MAC address, and the PPPoE protocol arrangement will be omitted since they are the same as those for the shortcut communication initiation in FIG. 6.

Similarly, the expanded portion of the PPPoE protocol is the same as that of the shortcut communication initiation. However, the type of the TAG type indicates the contents of not the shortcut communication initiation but the shortcut communication completion. This TAG type is used for determining whether or not to allow the shortcut communication completion.

Figure 10:
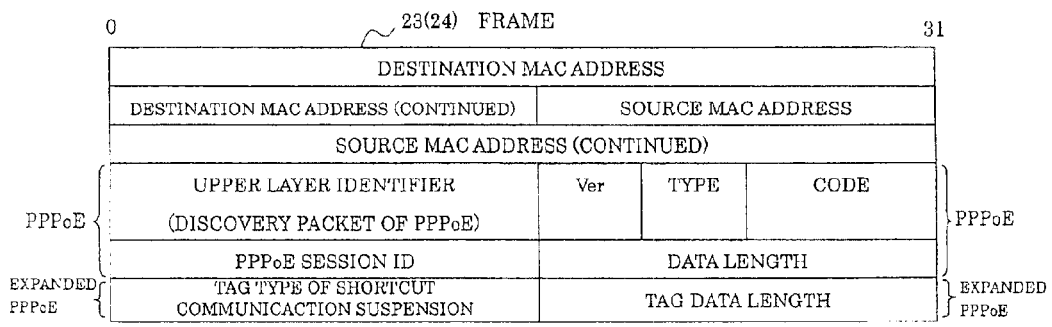
FIG. 10 is a diagram showing a format of a frame received when a shortcut communication is suspended in operation embodiments of a communication device according to the present invention.

If the received frame 24 is one for suspending the shortcut communication shown in FIG. 10, the controller 30 proceeds to step S25 to restart the shortcut communication, and returns to step S2 to wait for the frame.

FIG. 10 shows a frame format of the shortcut communication suspension. The description of the PPPoE protocol and its expanded portion are omitted since they are the same as those of the shortcut communication completion.

Similarly, this TAG type has contents showing not the shortcut communication initiation but the shortcut communication suspension. This TAG type is used for determining whether or not to allow the shortcut communication suspension.

Figure 11:
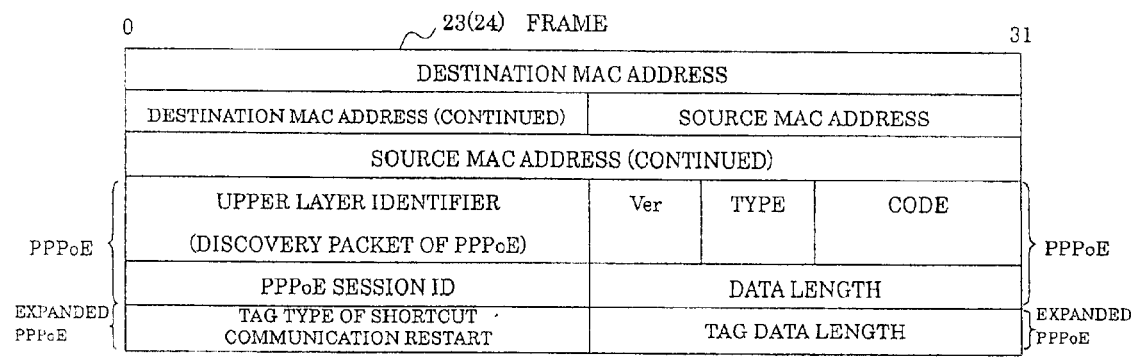
FIG. 11 is a diagram showing a format of a frame received when a shortcut communication is restarted in operation embodiments of a communication device according to the present invention.

If the received frame 24 is the shortcut communication resumption frame shown in FIG. 11, the controller 30 changes the carrier network connection availability parameter to "0x0001" in order to suspend the connection with the carrier network CN (at step S26).

FIG. 11 shows the frame format of the shortcut communication restart. The description of the PPPoE protocol and its expanded portion are omitted since they are the same as those of the shortcut communication completion.

Similarly, this TAG type has contents showing not the shortcut communication initiation but the shortcut communication resumption. This TAG type is used for determining whether or not to allow the shortcut communication restart.

Hereinafter, the process of the user terminals 11 and 12 will be described.

Figure 12:
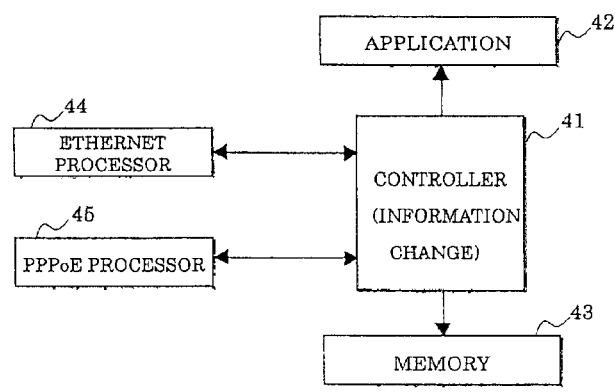
FIG. 12 is a block diagram showing an embodiment of a user terminal used for a communication device according to the present invention.

FIG. 12 shows an arrangement of the user terminals 11 and 12, which is composed of a controller 41, an application 42, a memory 43, an Ethernet processor 44, and a PPPoE processor 45. Those may be internally composed of a CPU, a ROM, a RAM and the like (not shown).

The controller 41 performs the overall control of the user terminal 11 such as generating frames. The memory 43 holds the information necessary for the operation of the controller 41. The Ethernet processor 44 performs the communication process by the Ethernet protocol. The PPPoE processor 45 prepares the PPPoE protocol and the expanded form thereof such as the TAG type within the frame.

Figure 13:
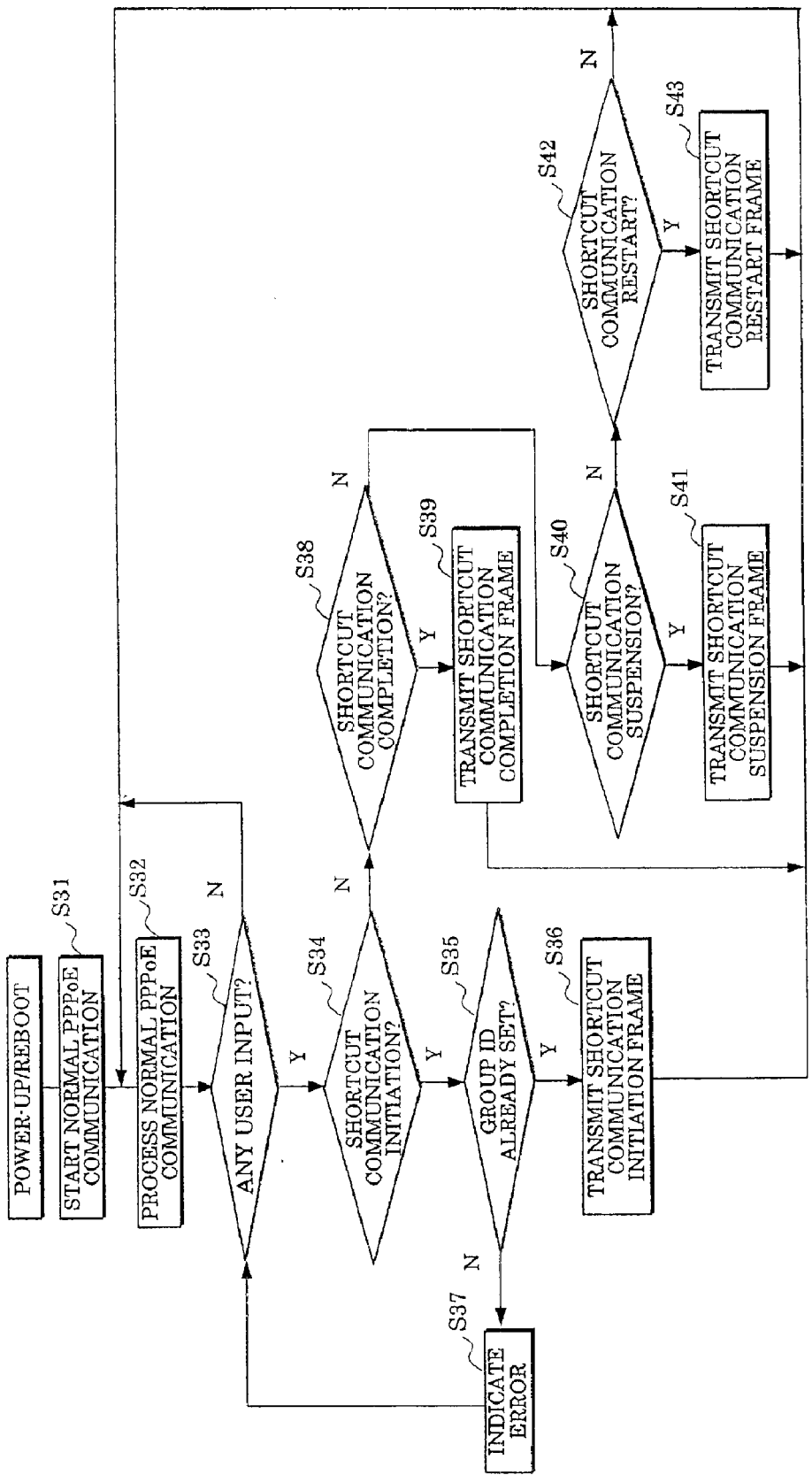
FIG. 13 is a flow chart showing a control program of an operation embodiment (1) executed by a user terminal used for a communication device according to the present invention.

FIG. 13 shows a flow chart of an operation embodiment (1) of the user terminal according to the present invention. The description of the TTL value shown in FIG. 4, the description of the contents of the table TBL shown in FIG. 5, and the contents of the frames shown in FIGS. 6–11 are common to those for the communication device 15, so that they will be referred to as required. The operation of the user terminal in the embodiment (1) will be described referring to the above-mentioned figures.

After the power-up, when the access to the Internet is instructed in the user terminal 11, the PPPoE processor 45 starts the processing for the connection with the edge device 18 through the ONU 13 and the communication device 15 (at step S31). The user terminal 11 performs an Internet connection according to the normal PPPoE process (at step S32).

Then, the controller 41 determines whether or not there have been inputs from the user A through the application 42 (at step S33). In the absence of inputs from the user A, the routine returns to step S32 to execute the normal communication process.

In the presence of inputs from the user A, the controller 41 determines whether or not the inputs are instructions for the shortcut communication initiation (at step S34), if it is the case, the controller 41 determines whether or not a group ID is set within the instructions (at step S35).

If the group ID is set, the controller 41 of the user terminal 11 sets the group ID and the password determined mutually with the user B, and the IP address allocated to the user terminal B in the communication software of the user terminal 11, and sets the function of the shortcut communication "ON".

Then, the PPPoE processor 44 and the Ethernet processor 45 of the user terminal 11 prepares the frame 23 shown in FIG. 6 to be transmitted (at step S36).

If the group ID is not set, the controller 41 indicates an error through the application 42 (at step S37), and the routine returns to the user input of step S33.

If the user inputs are not the shortcut communication initiation at step S34, the controller 41 determines whether or not the inputs are the instructions for the shortcut communication completion (at step S38).

In case of the shortcut communication completion, the frame 23 shown in FIGS. 1 and 9 is prepared and transmitted (at step S39).

If the inputs are not the shortcut communication completion at step S38, the controller 41 determines whether or not the inputs are the instructions for the shortcut communication suspension (at step S40).

If the input is the shortcut communication suspension, the frame 23 shown in FIG. 10 is prepared and transmitted (at step S41).

If the input is not the shortcut communication suspension at step S40, the controller 41 determines whether or not the inputs are the instructions for the shortcut communication restart (at step S42).

In case of the shortcut communication restart, the frame 23 shown in FIG. 11 is prepared and transmitted (at step S43).

Figure 14:
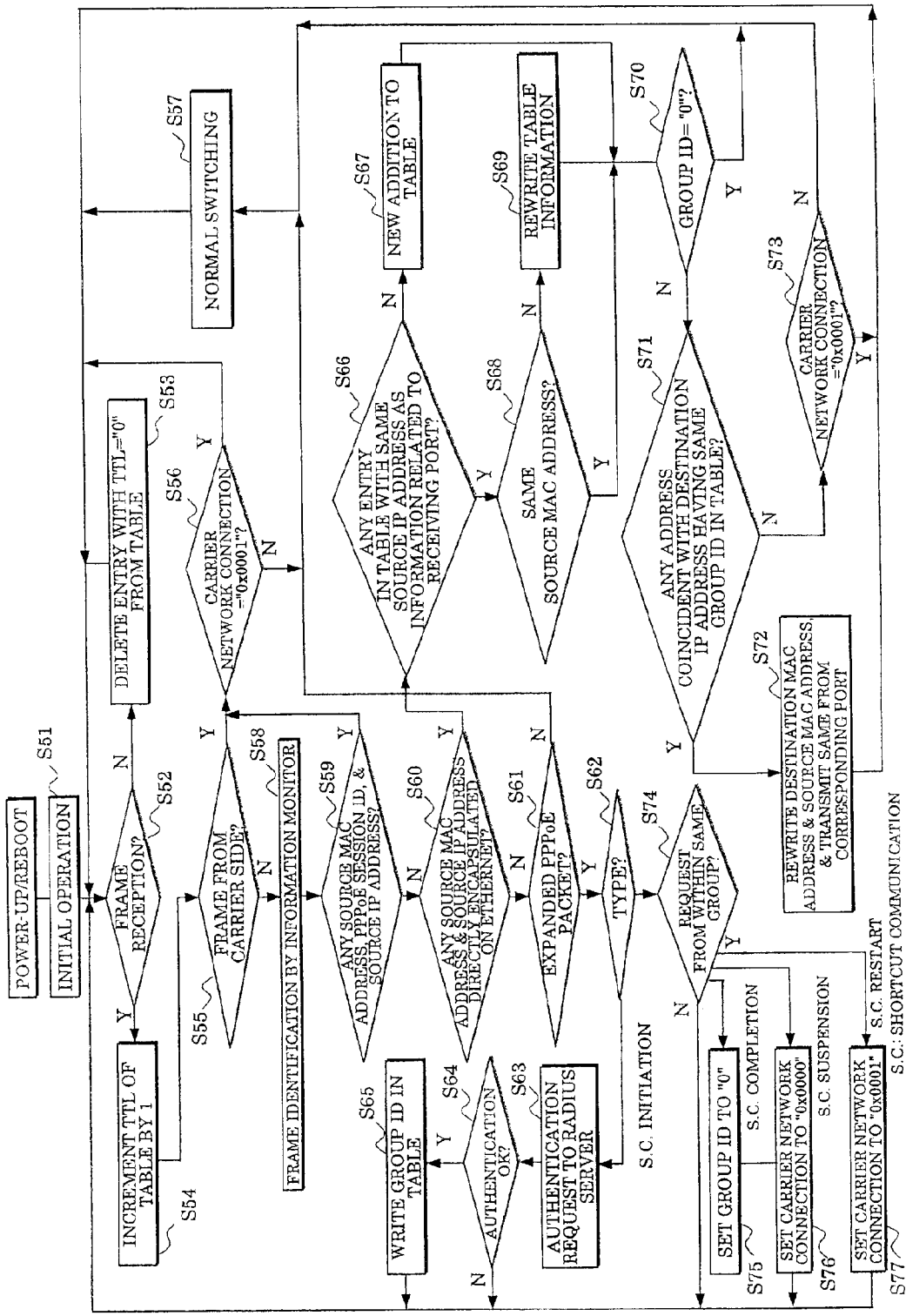
FIG. 14 is a flow chart showing a control program of an operation embodiment (2) executed by a communication device according to the present invention.
Figure 15:
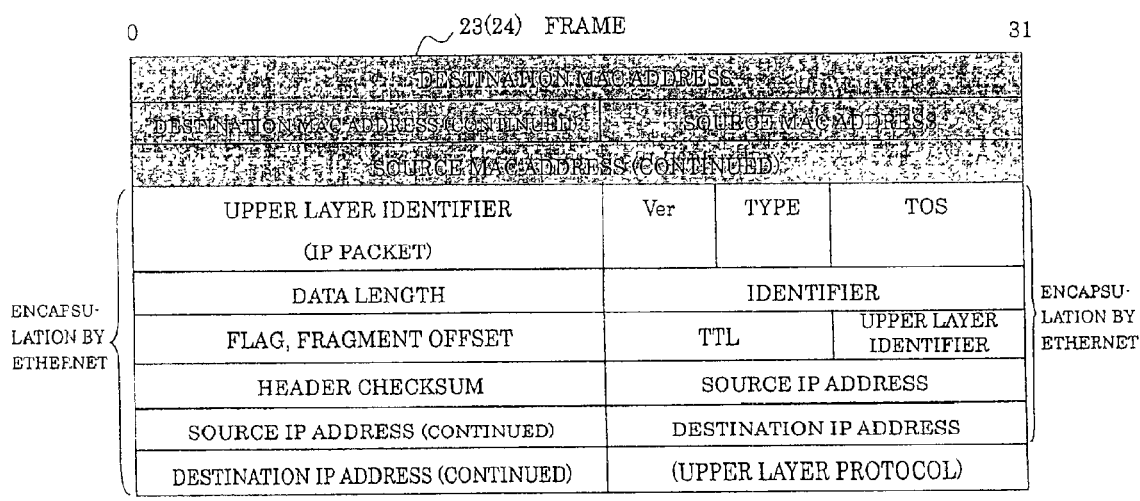
FIG. 15 is a diagram showing a format of a frame received during a shortcut communication in an operation embodiment (2) of a communication device according to the present invention.
Figure 16:
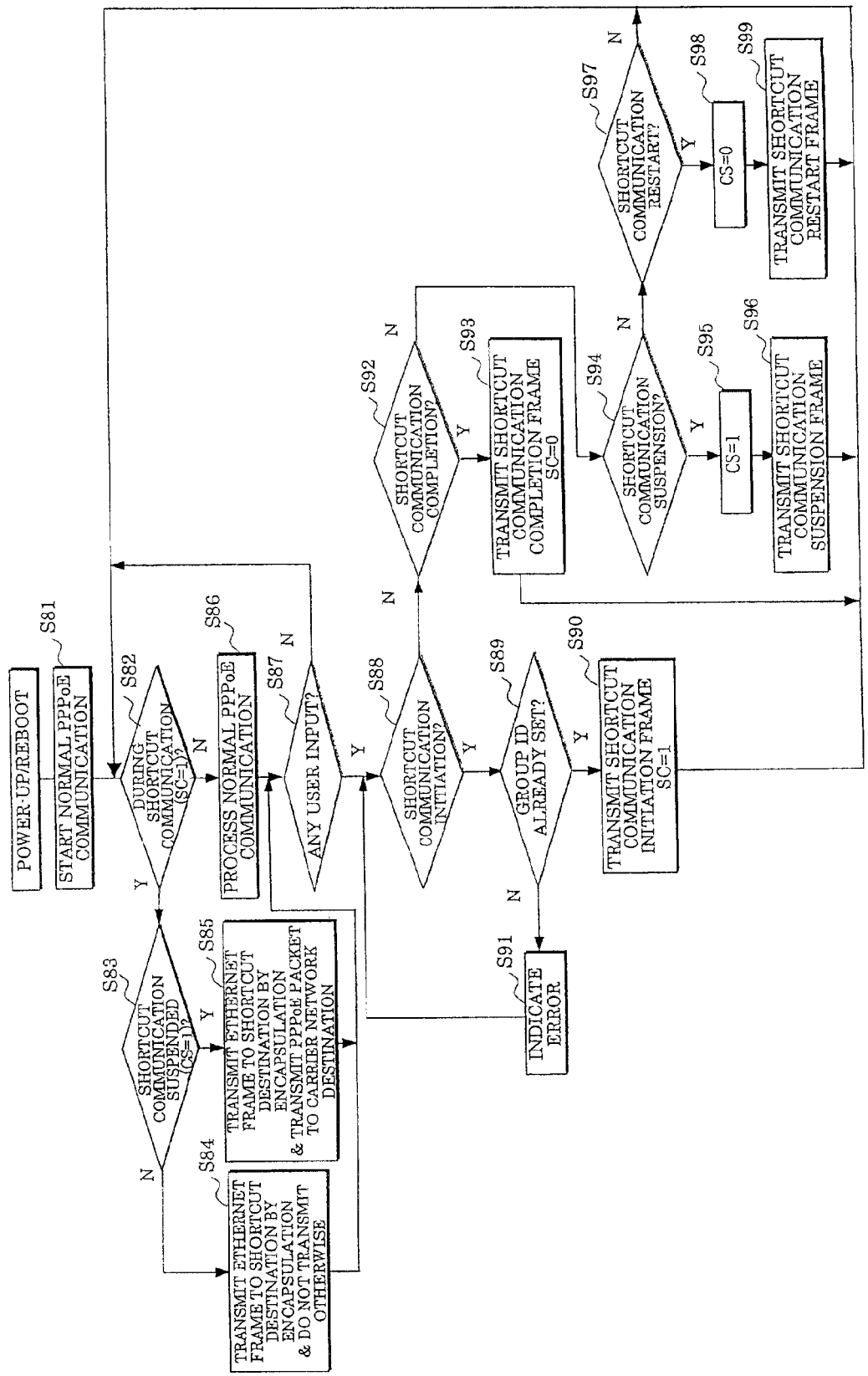
FIG. 16 is a flow chart showing a control program of an operation embodiment (2) executed by a user terminal used for a communication device according to the present invention.

Embodiment (2): FIGS. 14–16

Hereinafter, an operation embodiment (2) of the communication device 15 shown in FIG. 2 will be described in case the frame 24 during the shortcut communication is encapsulated not on the expanded PPPoE protocol but on the Ethernet.

FIG. 14 shows a flow chart of the communication device in this operation embodiment (2). FIG. 15 shows a format of a frame exchanged between the user terminal 11 and the communication device 15 during the shortcut communication in the operation embodiment (2).

Hereinafter, the embodiment (2) of the communication device will be described referring to FIGS. 14 and 15. It is to be noted that the same reference numerals are used for the operation common to the operation embodiment (1), and the description thereof is omitted.

Firstly, steps S51–S58 respectively corresponding to steps S1–S8 of the embodiment (1) are executed.

Then, the information monitor 33 determines whether or not the source MAC address, the PPPoE session ID, and the IP address are included in the received frame 24 (at step S59). If they are included, the routine returns to step S56.

If the source MAC address, the PPPoE session ID, and the IP address are not included in the received frame 24, the information monitor 33 determines whether or not the source IP address directly encapsulated on the Ethernet exists in the received frame 24 (at step S60).

If the source IP address or the like directly encapsulated on the Ethernet does not exist in the received frame 24, steps S61–S65 respectively corresponding to steps S10–S14 of the embodiment (1) are executed. At this time, the initiation process of the shortcut communication including the authentication by the RADIUS using the frame 24 shown in FIG. 6 and FIG. 7 are performed.

It is to be noted that the initiation process of the shortcut communication is the same as that executed by the expanded PPPoE in the embodiment (1).

If the source IP address directly encapsulated on the Ethernet exists in the received frame 24, the determination of whether or not to transmit the frame 24, and the transmission of the frame are performed by executing steps S66–S73 respectively corresponding to steps S15–S22 of the embodiment (1).

FIG. 15 shows the frame 24 directly encapsulated on the Ethernet which differs from the case of the expanded PPPoE shown in FIG. 8 in that the PPPoE protocol is excluded, and that the source IP address, the destination IP address, and the like corresponding to the PPPoE expanded portion are written in a form directly encapsulated on the Ethernet.

Also, when it is determined not to be the shortcut communication initiation at step S62 corresponding to step S11, steps S74–S77 respectively corresponding to steps S23–S26 of the embodiment (1) are executed. The completion/suspension/restart processings of the shortcut communication using the frame 24 shown in FIGS. 9–11 are performed.

It is to be noted that the initiation/suspension/restart processings of the shortcut communication are the same operations as those of the embodiment (1) since they are performed by the expanded PPPoE.

Hereinafter, the operation embodiment (2) of the user terminal 11 will be described. In this case, the arrangement shown in FIG. 12 is adopted.

FIG. 16 shows a flow chart of the operation embodiment (2) which will be described referring to the common figures to the embodiment (1) wherever necessary.

Firstly, step S81 corresponding to step S31 is executed. Then, the controller 41 determines whether or not a flag SC is "1", indicating that it is in the process of the shortcut communication (at step S82).

If the flag SC is "1", the controller 41 determines whether or not a flag CS is "1", indicating that the shortcut communication is suspended (at step S83).

If the flag CS is "0", the Ethernet processor 44 encapsulates the frame 23 on the Ethernet to be transmitted to the shortcut destination, and does not transmit the frame 23 to the destination other than the shortcut destination (at step S84).

If the flag CS is "1", the Ethernet processor 44 encapsulates the frame 23 on the Ethernet to be transmitted to the shortcut destination. On the other hand, the PPPoE processor 45 encapsulates the frame 23 on the PPPoE to be transmitted to the destination other than the shortcut destination (at step S85). It is to be noted that after completing step S84 or S85, the routine proceeds to step S87.

Then, steps S86–90 respectively corresponding to steps S32–37 are executed. It is to be noted that step S90 is executed for the shortcut communication initiation so that the flag SC is set to "1" together with the transmission of the frame 23.

When it is found at step S88 that the frame 23 is not for the shortcut communication initiation, steps S92–S93 corresponding to steps S38–S39 are executed. It is to be noted that step S93 is executed for the shortcut communication completion so that the controller 41 sets the flag SC to "0" together with the frame transmission.

When the shortcut communication completion is not made at step S92, the controller 41 determines whether or not the inputs are the instructions for the shortcut communication suspension (at step S94).

When the shortcut communication suspension is not made, the flag CS is set to "1" (at step S95), and the Ethernet processor 44 prepares the frame 23 shown in FIG. 10 to be transmitted (at step S96).

When the shortcut communication suspension is not made at step S94, the controller 41 determines whether or not the inputs are the instructions for the shortcut communication restart (at step S97).

When the shortcut communication restart is not made, the controller 41 sets the flag CS to "0" (at step S98), and the Ethernet processor 44 prepares the frame 23 shown in FIG. 11 to be transmitted (at step S99).

As described above, with a communication device according to the present invention, datalink layer information included in data transmitted from a source user terminal is read, a communication function by an existing protocol of outputting data group to the network service provider apparatus when the datalink layer information includes communication request information to the network service provider apparatus is maintained, and the data are outputted directly to a destination user terminal when the datalink layer information includes shortcut communication request information with a destination user terminal.

Therefore, it becomes unnecessary to constrain the network service provider apparatus longer than necessary even when the data amount outputted from the source user terminal to the destination terminal becomes enormous, thereby enabling a speedup of the communication.

I claim:

1. A communication device comprising:
a connection processor for performing communications between a user terminal and a network service provider apparatus;
an information monitor for reading datalink layer information included in data transmitted from a source user terminal and for monitoring whether or not communication request information to the network service provider apparatus or shortcut communication request information with a destination user terminal is included in the datalink layer information; and a controller for outputting the data to the network service provider apparatus when the datalink layer information includes the communication request information, and for outputting the data to the destination user terminal when the datalink layer information includes the shortcut communication request information.

2. The communication device as claimed in claim 1 wherein the shortcut communication request information is encapsulated in the datalink layer information.

3. The communication device as claimed in claim 2 wherein the shortcut communication request information is encapsulated in an Ethernet protocol within the datalink layer information.

4. The communication device as claimed in claim 2 wherein the communication request information comprises a PPPoE protocol, and the shortcut communication request information is encapsulated in the PPPoE protocol within the datalink layer information.

5. The communication device as claimed in claim 1 wherein the datalink layer information includes authentication information, and the controller determines whether or not a shortcut communication between the source user terminal and the destination user terminal is allowed based on the authentication information to make the connection processor output the data to the destination user terminal when the shortcut communication is allowed.

6. The communication device as claimed in claim 5 wherein the authentication information is described in a format based on a RADIUS format, and the controller outputs the authentication information to a RADIUS server to determine whether or not the shortcut communication is allowed by referring to a verification result in the RADIUS server.

7. The communication device as claimed in claim 1 wherein the controller is provided with a memory for holding address information of the source user terminal and the destination user terminal associated with a communication port, and makes the connection processor output the data through the communication port associated with the address information included in the shortcut communication request information when the data include the shortcut communication request information.

8. The communication device as claimed in claim 1 wherein the connection processor suspends the communication with the network service provider apparatus when suspension request information of a connection with the network service provider apparatus is included in the communication request information as read by the information monitor.

9. The communication device as claimed in claim 1 wherein the controller controls an output destination of the data by rewriting an MAC address included in the datalink layer information.

10. The communication device as claimed in claim 1 wherein the controller determines whether or not a shortcut communication between the source user terminal and the destination user terminal is allowed by verifying the authentication information included in the datalink layer information from the source user terminal against the authentication information from the destination user terminal.

11. The communication device as claimed in claim 8 wherein the connection processor restarts the communication with the network service provider apparatus when restart request information of the connection with the network service provider apparatus is included in the communication request information as read by the information monitor.

* * * * *